(12) United States Patent
Wimmer et al.

(10) Patent No.: US 7,367,916 B2
(45) Date of Patent: May 6, 2008

(54) BELT DRIVE FOR AUXILIARY UNITS OF AN INTERNAL COMBUSTION ENGINE

(75) Inventors: Rudolf Wimmer, Haidershofen (AT); Peter Foessl, Behamberg (AT); Philipp Wieser, Schiedlberg (AT); Heinz Lemberger, Unterfoehring (DE)

(73) Assignees: Bayerische Motoren Werke Aktiengesellschaft, Munich (DE); Peugeot Citroen Automobiles Societe Anonyme, Velizy Villacoublay (FR)

( * ) Notice: Subject to any disclaimer, the term of this patent is extended or adjusted under 35 U.S.C. 154(b) by 203 days.

(21) Appl. No.: 11/131,420

(22) Filed: May 18, 2005

(65) Prior Publication Data

US 2005/0215392 A1  Sep. 29, 2005

Related U.S. Application Data

(63) Continuation of application No. PCT/EP2003/011405, filed on Oct. 15, 2003.

(30) Foreign Application Priority Data

Nov. 26, 2002   (DE) ................ 102 22 074

(51) Int. Cl.
  F16H 37/02   (2006.01)
  F02B 67/06   (2006.01)
(52) U.S. Cl. .............. 476/28; 123/198 R; 474/139
(58) Field of Classification Search ........... 474/139, 474/131; 476/28; 123/198 R
See application file for complete search history.

(56) References Cited

U.S. PATENT DOCUMENTS

| | | | | |
|---|---|---|---|---|
| 255,860 A * | 4/1882 | Holt | ............ | 241/227 |
| 782,978 A * | 2/1905 | Magruder | ............ | 476/28 |
| 964,750 A * | 7/1910 | Carey | ............ | 476/15 |
| 3,297,010 A * | 1/1967 | Beck | ............ | 123/179.26 |
| 4,813,915 A * | 3/1989 | Kotzab | ............ | 474/133 |
| 2006/0213317 A1* | 9/2006 | Lemberger | ............ | 74/579 R |
| 2006/0249118 A1* | 11/2006 | Serkh et al. | ............ | 123/198 R |
| 2006/0264283 A1* | 11/2006 | Lemberger | ............ | 474/135 |

FOREIGN PATENT DOCUMENTS

| | | |
|---|---|---|
| DE | 1 810 126 | 4/1960 |
| DE | 1 087 822 | 8/1960 |
| DE | 39 34 884 A1 | 4/1991 |
| DE | 40 39 207 A1 | 6/1992 |
| DE | 4039207 A1 * | 6/1992 |

(Continued)

*Primary Examiner*—Richard Ridley
*Assistant Examiner*—Terence Boes
(74) *Attorney, Agent, or Firm*—Crowell & Moring LLP

(57) ABSTRACT

A belt drive for a secondary unit of an internal combustion engine includes a friction wheel drive having a friction wheel, a cam device for adjusting the engagement of the friction wheel to the drive wheel of the secondary unit, the cam device having a cam, a swivel arm by which the friction wheel is connected to the cam which is rotationally mounted on a side of the engine, and a spring biasing the swivel arm in a tension direction. The friction wheel is in permanent position of frictional engagement with a drive wheel of the secondary unit to drive the secondary unit and with an outside of a belt on a drive wheel of the internal combustion engine or of another secondary unit.

12 Claims, 4 Drawing Sheets

FOREIGN PATENT DOCUMENTS

| | | |
|---|---|---|
| DE | 100 51 977 A1 | 5/2002 |
| DE | 10051977 A1 * | 5/2002 |
| DE | 100 36 504 A1 | 7/2003 |
| DE | 102 36 746 A1 | 2/2004 |
| DE | 10236746 A1 * | 2/2004 |
| FR | 2 544 825 | 10/1984 |
| JP | 2000-257553 | 9/2000 |

* cited by examiner

BELT DRIVE FOR AUXILIARY UNITS OF AN INTERNAL COMBUSTION ENGINE

CROSS REFERENCE TO RELATED APPLICATIONS

This application is a continuation of International Patent Application No. PCT/EP2003/011405, filed Oct. 15, 2003, designating the United States of America, and published in German as WO 2004/048759 A1, the entire disclosure of which is incorporated herein by reference. Priority is claimed based on German Patent Application No. 102 55 074.3, filed Nov. 26, 2002.

SUMMARY AND BACKGROUND OF THE INVENTION

The invention relates to a belt drive for auxiliary units of an internal combustion engine with which a friction wheel drive is associated for driving a secondary unit provided separately on the internal combustion engine and whose drive wheel cooperates frictionally with a friction wheel, the friction wheel being arranged for adjustment relative to the drive wheel with regard to frictional contact.

DE 39 34 884 A1 discloses a belt drive, wherein the friction wheel is driven through a belt tightener in the belt drive. The friction wheel thus driven indirectly by the belt is arranged with the belt tightener on a rocking lever, while for uncoupling the clamping roll adjustment from the friction wheel adjustment to the secondary unit's drive wheel, an eccentric device serves, which is adjustable by hand in case of need, independently of the clamping roll adjustment.

Also, unpublished patent application P 102 36 746 discloses a belt drive with a friction wheel arrangement in which a friction wheel frictionally cooperating with the outside of the belt in the wrap-around portion of the belt is also in frictional driving communication with the drive wheel of a separate secondary unit. Information for sustaining a driving, permanent position of engagement of the friction wheel with the drive wheel on the one hand and with the belt on the other cannot be learned from this document.

An object of the invention is to offer a constructionally simple readjusting device for a friction wheel cooperating directly by friction with a belt for driving a separate secondary unit to achieve of a proper permanent engagement position of the friction wheel.

The object is achieved in that the friction wheel also cooperates with the outer side of the belt in the area of its contact with a driving wheel of the internal combustion engine or auxiliary unit, and is held in a permanent position of engagement with driving wheel and belt by a rocking lever journaled at the machine end on a cam arranged for rotary movement, while the cam of the readjusting device, driven in rotation under the effect of a spring bias, acts upon the rocking lever in the tensional or pressing direction with spring bias in the corresponding direction.

With the invention a structurally simple readjustment device is advantageously achieved, whose further advantage is a compact configuration.

An advantageously great readjustment range is achieved if the cam is mounted with an eccentricity directed transversely of the tension or pressure direction of the rocking lever as its starting position.

Also, a compact cam system is advantageously achieved in that the rocking lever is journaled by an eye formed in the end section remote from the friction wheel, which is equipped in a recess coaxial with the cam axis with a biased coil turning spring, while the coil spring fixed at one end on the machine side is disposed for rotating action at the other end on the cam.

Furthermore, for the achievement of a readjustment device that is light and small, it is proposed that the cam formed from a plastic be mounted for rotation on a metal sleeve disposed in a recess and receiving the coil spring, which is disposed nonrotationally through an end section of the rotational helical spring passing through the bottom of the metal sleeve and entering conformingly into a cavity on the machine side, and furthermore is fastened, by a threaded bolt coaxial with the cam axis with the interposition of a fastening cover of the cam device, drivingly against an abutment surface on the machine side, and the cam is disposed on the metal sleeve between abutment surface and the fastening cover with axial clearance.

For an advantageously simple construction of the cam device provision is made according to the invention that the metal sleeve has on the fastening cover a marginal cut-out fitted circumferentially corresponding to the adjustability of the friction wheel for the free passage of an end section of the helical spring directed transversely to the cam axis for rotational engagement with the cam, and that the metal sleeve has an additional marginal cut-out for the engagement of an antirotational projection disposed on the fastening cover.

For an adjusting device of short and light-weight construction, the invention furthermore provides that the cam is in connection with the eye of the rocking arm formed from a plastic, with the interposition of a friction bearing sleeve, which is formed relatively close to the eye, with a fork-like friction wheel pickup, and that the cam device of the short-construction rocking arm is disposed between the secondary unit's drive wheel and the drive wheel partly covered by the drive belt on a knob provided on the front of the internal combustion engine. A space-saving arrangement of the adjusting device is thus also achieved.

Lastly, a proposal of the invention is based on the fact that the friction wheel comprises a spoked wheel body formed from plastic, with a support of a rubber material disposed on the external circumference, the spoked wheel body being supported through an integrated, encapsulated rolling bearing against a bearing pin of the fork of the rocking arm.

The invention is described with the aid of a preferred embodiment represented in the drawings.

DETAILED DESCRIPTION OF THE DRAWINGS

Figure 1:
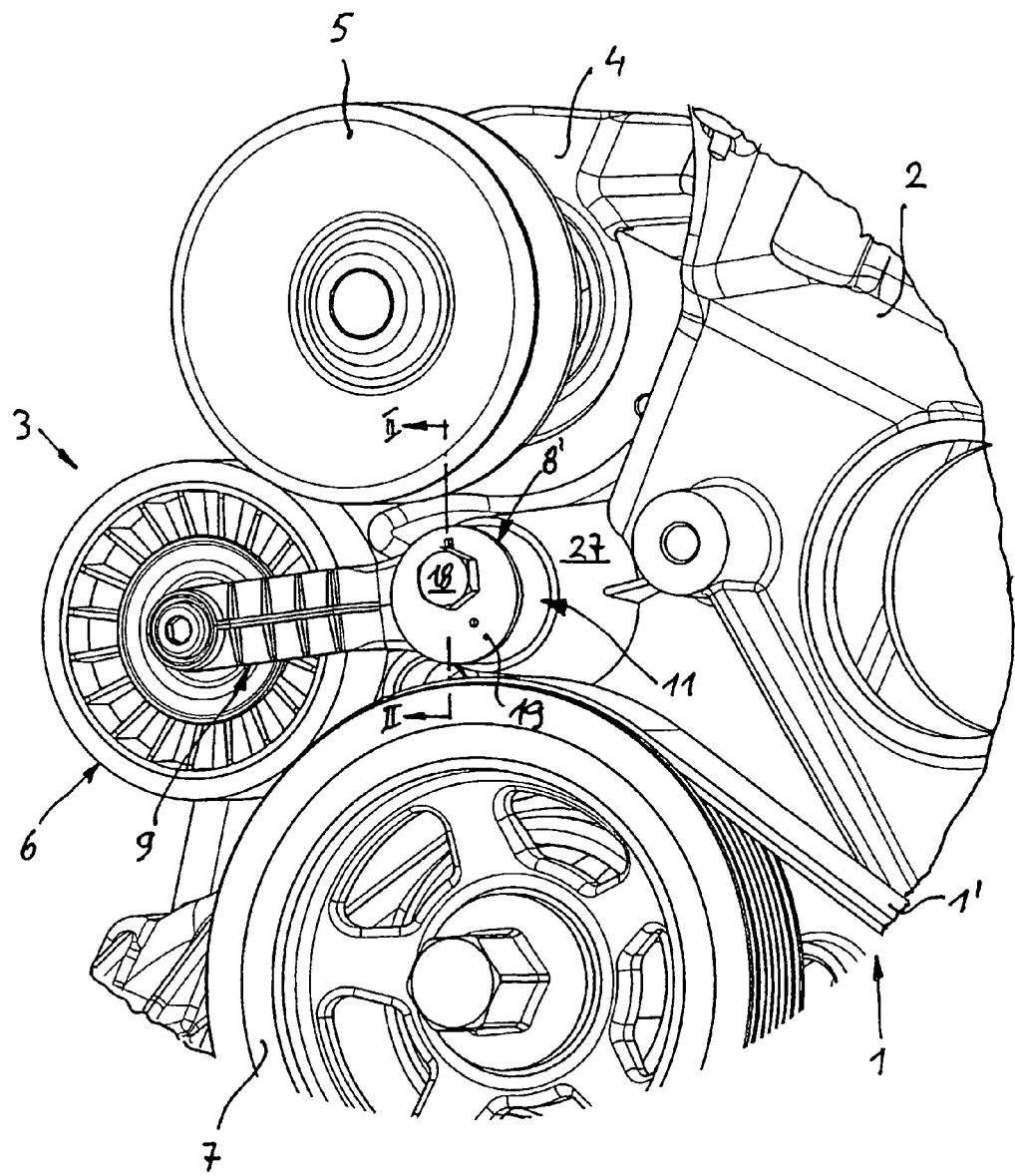
FIG. 1 represents an internal combustion engine with a friction wheel with an adjusting device according to the invention.

A belt drive 1, shown only in sections, for auxiliary units of an internal combustion engine 2 shown only section-wise, comprises a friction wheel drive 3 for driving a secondary unit 4 provided separately on the internal combustion engine, which is preferably a coolant pump. The secondary unit 4 has a drive wheel 5 which cooperates with a friction wheel 6 of the friction wheel drive 3 driven on the belt side.

As seen in FIG. 1, the friction wheel 6 furthermore cooperates frictionally with the outside of the belt 1' in the wrap-around portion of a drive wheel 7 of the internal combustion engine 2 or an auxiliary unit. Also, the friction wheel 6 is held in a position of permanent engagement with drive wheel 5 and belt 1', by a cam 8 disposed for rotation on the machine side, while the cam 8 of the adjusting device 11, driven in rotation under the action of a biased spring 10, acts on the rocking arm 9 in the pulling direction or in the pushing direction according to the spring bias directed accordingly. Preferably, in the adjusting device 11 shown in FIGS. 1-4 the friction wheel 6 is held in a permanently engaged position by means of the cam 8, spring-loaded counterclockwise, through the rocking arm 9 which is biased tensionally.

To achieve a relatively great adjustment range, the cam 8 is mounted with an eccentricity "e" directed across the pulling direction of the arm 9 as its initial position.

For a compact adjusting device 11, the rocking arm 9 is mounted at an eye 12 formed in the end section remote from the friction wheel 6 on the cam 8 which is equipped with a biased coil spring 10' in a recess 14 coaxial with the cam axis 13, the coil spring 10' held fixed on the machine at one end, the coil spring 10' fixed at one end on the machine is disposed at the other end on the cam 8, acting for rotation.

A cam device 8' of small and light construction is furthermore achieved by the fact that the cam 8, formed from a plastic, is mounted for rotation on a metal bush 15 accommodating the coil spring 10' and disposed in its recess 14. The metal bush 15 is rotationally fixed through an end section 17 of the coil spring 10' engaging conformingly in a cavity 16 on the machine side and furthermore, through a bolt 18 coaxial with the cam axis 13, with the interposition of a washer 19, it is driven against an abutment surface 20. Furthermore, the cam 8 is disposed on the metal bush 15 between the abutment surface 20 and the washer 19.

Furthermore, the aforesaid metal bush 15 has on the securing cover side a marginal section 21 appropriately adapted in the circumferential direction for the adjustability of the friction wheel 6 for the free pass-through of an end section 22 directed transversely of the cam axis 13 of the coil spring 10' for rotatory engagement of the cam 8. The metal bush 15 has an additional marginal notch 23 for engaging an antirotational projection 24 which prevents any co-rotation of the washer 19 when the bolt 18 of the eccentric device 8' is tightened.

Figure 2:
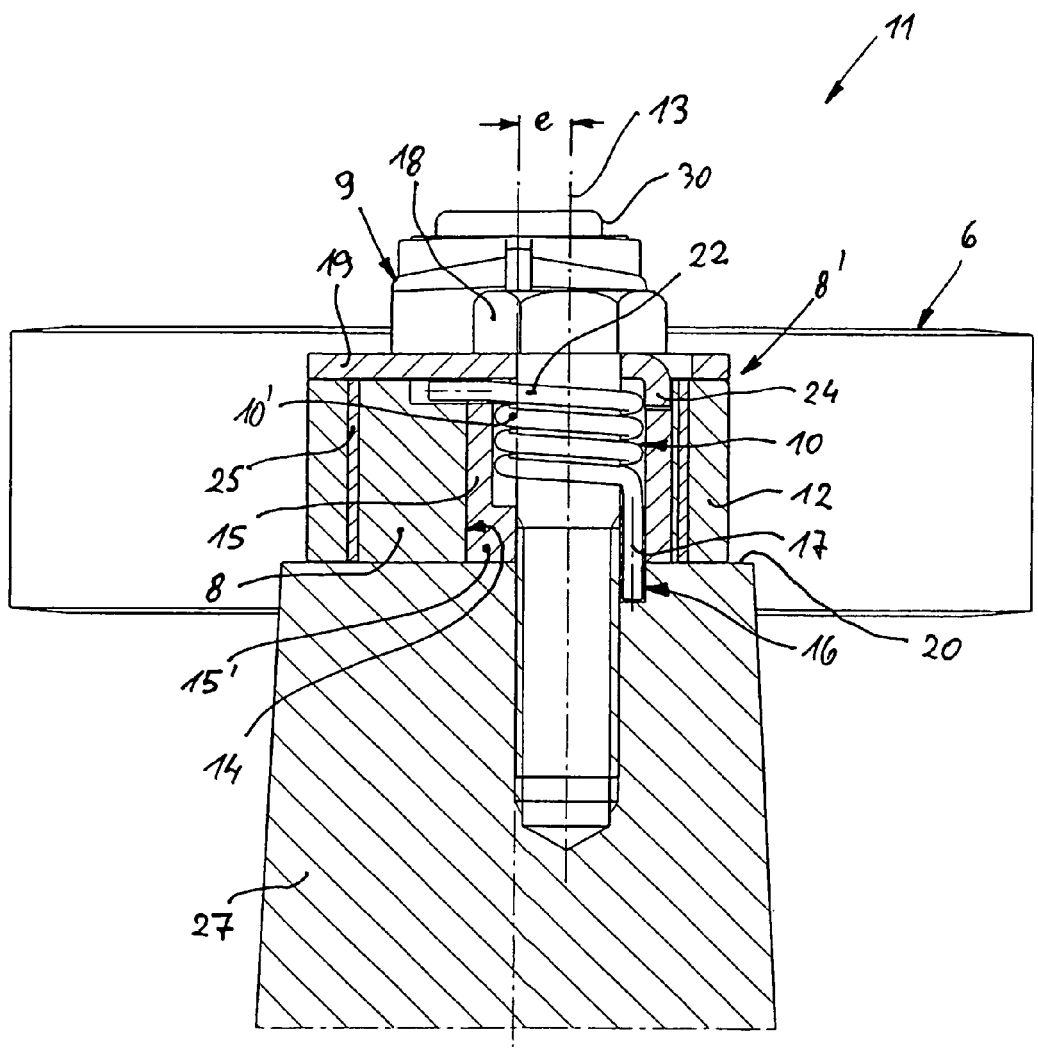
FIG. 2 shows a section taken along line II-II through the cam system of the adjusting device.
Figure 3:
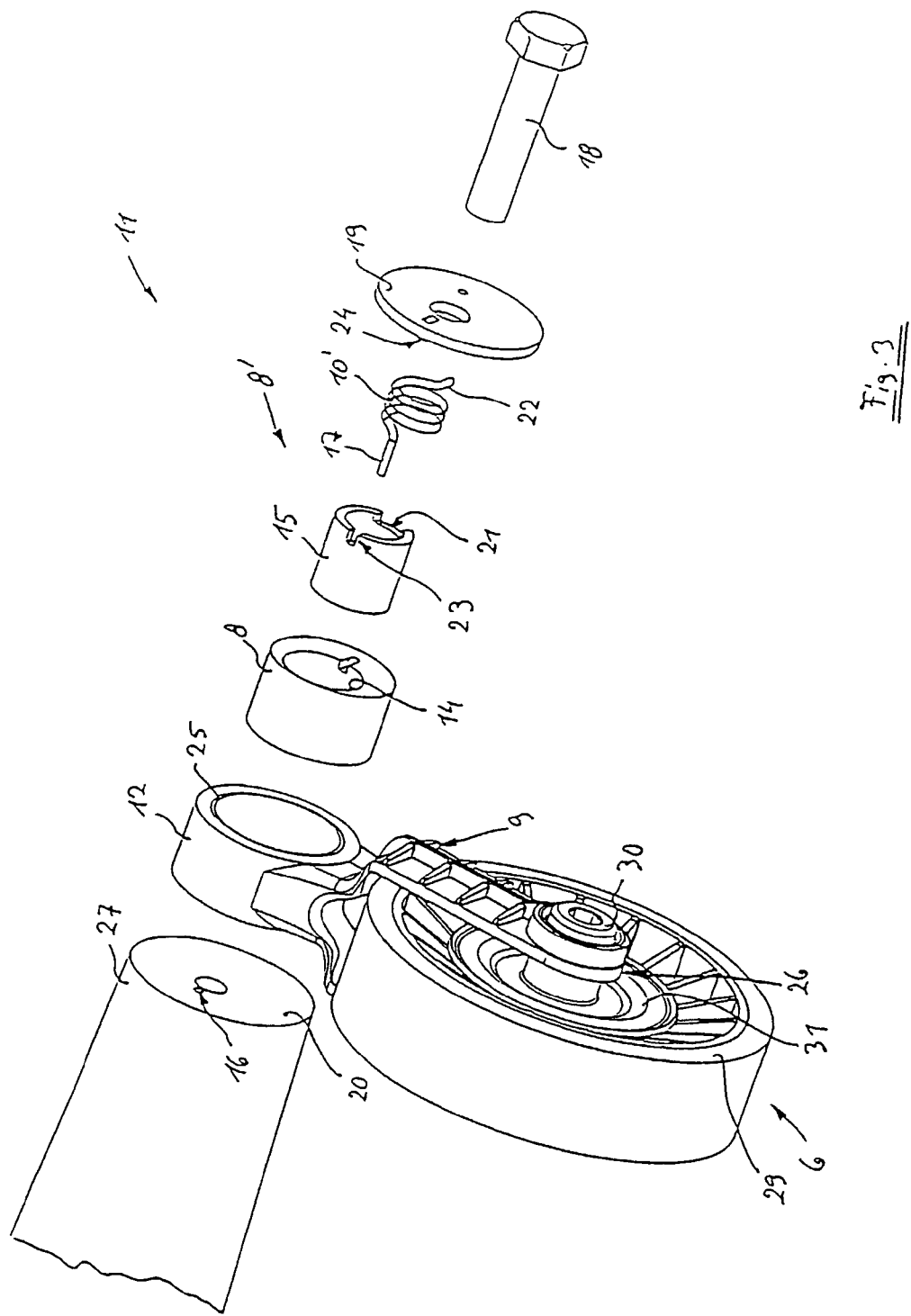
FIG. 3 shows an exploded representation of the adjusting device with the cam system.

As FIGS. 2 and 3 show, the cam 8 is joined with the interposition of a bushing 25 to the eye 12 of the arm 9 formed of plastic, which is relatively closely adjacent the eye 12 with a fork-like friction wheel socket 26. The compact eccentric device 8' makes it possible to arrange the adjusting device 11 with the short arm 9 between the secondary unit's drive wheel 5 and the drive wheel 7 partially wrapped around by the belt 1' on a post 27 provided on the end of the internal combustion engine 2, for the achievement of an advantageous utilization of space.

Figure 4:
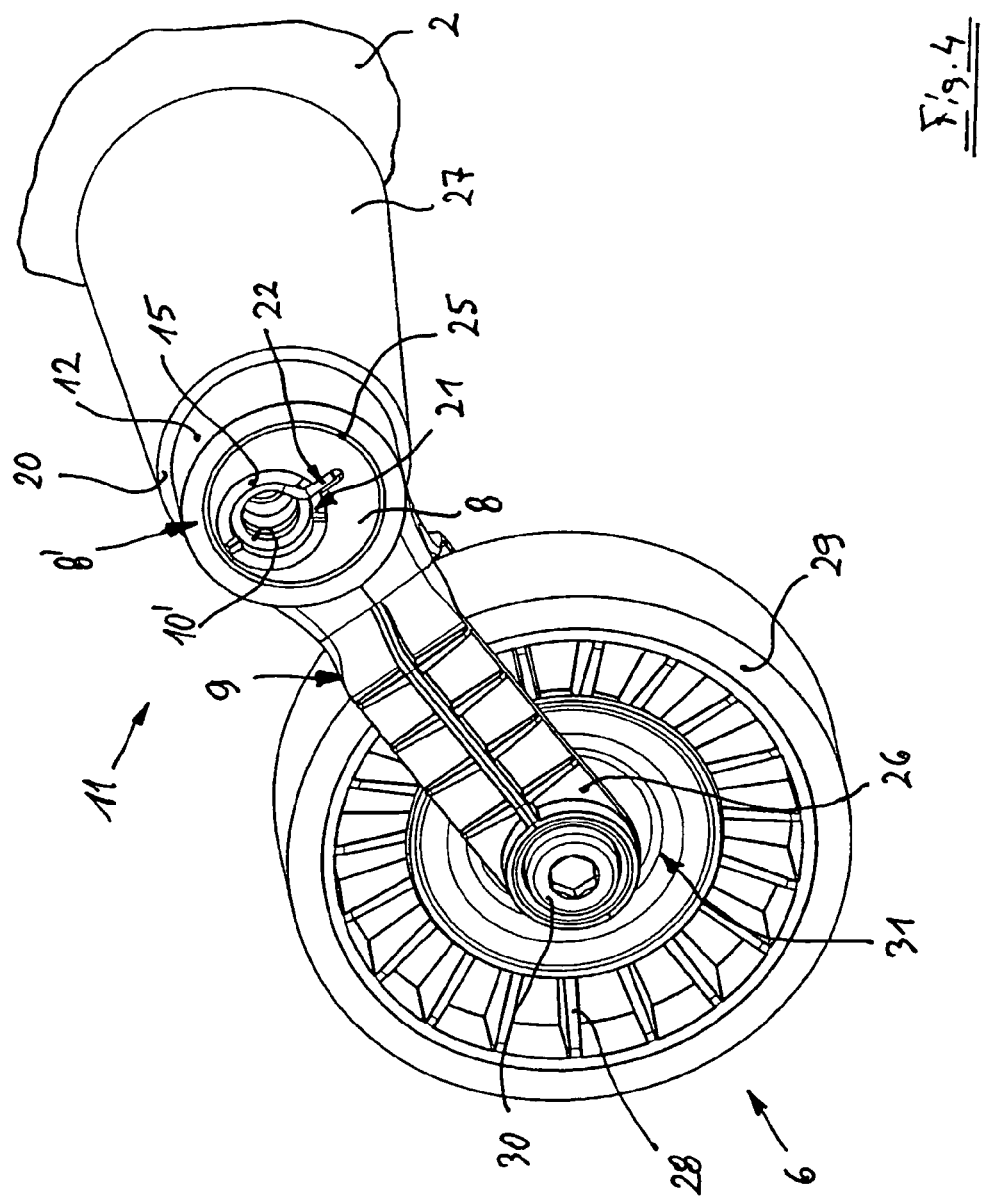
FIG. 4 shows the cam system open at the end to show the cam rotatable under spring stress for readjustment of the friction wheel.

Lastly, especially FIGS. 1 and 4 show that the friction wheel comprises spoked wheel bodies 28 formed of plastic, with a cover 29 of a rubber material disposed on its outer circumference. Also, the spoked wheel 28 is supported against a bolt 30 of the swiveling arm's fork 26 through an integrated and encapsulated roller bearing 31.

With the invention, a lightweight adjusting device 11 of advantageously simple design requiring little space is achieved.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations falling within the scope of the appended claims and equivalents thereof.

What is claimed is:

1. A belt drive for a secondary unit of an internal combustion engine, comprising:
    a friction wheel drive having a friction wheel, wherein the friction wheel is positioned in permanent frictional engagement with a drive wheel of the secondary unit to drive the secondary unit and with an outside of a belt on a drive wheel of the internal combustion engine or of another secondary unit;
    a cam device arranged to be rotationally mounted on a side of the internal combustion engine to permit adjustment of the engagement of the friction wheel to the drive wheel of the secondary unit, the cam device having a cam;
    a rocking arm, said rocking arm extending between the friction wheel rotationally mounted on the rocking arm and the cam device; and
    a spring biasing the rocking arm in a tension direction.

2. The belt drive according to claim 1, wherein
the cam is mounted with an eccentricity that is transverse to the tension direction of the rocking arm when the cam is in an initial installation position.

3. The belt drive according to claim 2, wherein
the rocking arm is journaled through an eye formed in an end section remote from the friction wheel,
the rocking arm eye is located on the cam
the cam has a recess coaxial with the cam axis which receives the spring that is under bias, and
the spring is fixed at one end on an engine side and is disposed at the other end acting rotationally on the cam.

4. The belt drive according to claim 3, wherein
the cam is made of a plastic and is journaled for rotation on a metal bush that is disposed in the recess and accommodates the spring,
an end of the spring passes through the bottom of the metal bush and is fixed against rotation engaging conformingly in a cavity on the engine side,
    a bolt coaxial with the eccentric axis acting through a protective washer of the eccentric device is forcibly abutted against an abutment surface on the engine side, and
the cam between the abutment surface and the protective washer is disposed with axial free play on the metal bush.

5. The belt drive according to claim 4, wherein
the metal bush has on a protective washer side a marginal cutout with a width in a circumferential direction corresponding to the adjustability of the friction wheel for the free passage of the other end, pointing transversely of the cam axis, of the spring for rotational attachment to the cam, and
the metal bush has a wider marginal cutout for engagement by an antirotational projection disposed on the protective washer.

6. The belt drive according to claim 5, wherein
the cam is in connection with the eye of the arm, with the interposition of an antifriction bushing, which arm is formed relatively closely to the eye with a fork-like friction wheel receiver, and wherein the cam of the arm is disposed between the secondary unit's drive wheel and the drive wheel partially wrapped around by the belt, and the cam is arranged to be mounted on a post provided at the face of the internal combustion engine.

7. The belt drive according to claim 6, wherein the friction wheel comprises a spoked wheel formed of plastic, having a covering of a rubber material arranged on the outside circumference, and the spoked wheel is urged against a bolt of the fork of the arm through an integrated and encapsulated rolling bearing.

8. The belt drive according to claim 1, wherein the rocking arm is journaled through an eye formed in an end section remote from the friction wheel on the cam, the cam having a recess coaxial with the cam axis with the spring that is under bias, and the spring is fixed at one end on the engine side and is disposed at the other end acting rotationally on the cam.

9. The belt drive according to claim 8, wherein the cam is made of a plastic and is journaled for rotation on a metal bush that is disposed in the recess and accommodates the spring, an end of the spring passes through a bottom of the metal bush and is fixed against rotation engaging conformingly in a cavity on the engine side, a protective washer of the eccentric device is forcibly abutted against an abutment surface on the engine side by a bolt coaxial with the eccentric axis, and the cam between the abutment surface and the protective washer is disposed with axial free play on the metal bush.

10. The belt drive according to claim 9, wherein the metal bush has on a protective washer side a marginal cutout in the circumferential direction corresponding to the adjustability of the friction wheel for the free passage of the other end of the spring, said other spring end pointing transversely to the cam axis, and the metal bush has a wider marginal cutout for engagement by an antirotational projection disposed on the protective washer.

11. The belt drive according to claim 9, wherein the cam is in connection with the eye of the arm, with the interposition of an antifriction bushing, which arm is formed relatively closely to the eye with a fork-like friction wheel receiver, and the cam of the arm is disposed between the secondary unit's drive wheel and the drive wheel partially wrapped around by the belt, and the cam is arranged to be mounted on a post provided at the face of the internal combustion engine.

12. The belt drive according to claim 1, wherein the friction wheel comprises a spoked wheel formed of plastic, having a covering of a rubber material arranged on the outside circumference, and the spoked wheel is urged against a bolt of the fork of the arm through an integrated and encapsulated rolling bearing.

* * * * *